US007991551B2

(12) United States Patent
Samuel et al.

(10) Patent No.: US 7,991,551 B2
(45) Date of Patent: Aug. 2, 2011

(54) SYSTEM AND METHOD FOR DETERMINING A COLLISION STATUS OF A NEARBY VEHICLE

(75) Inventors: Stephen Samuel, Troy, MI (US); Christopher Nave, Ypsilanti, MI (US); W. Trent Yopp, Canton, MI (US); Roger Trombley, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 406 days.

(21) Appl. No.: 12/266,179

(22) Filed: Nov. 6, 2008

(65) Prior Publication Data

US 2010/0114467 A1 May 6, 2010

(51) Int. Cl.

*G08G 1/16* (2006.01)
*B60W 30/08* (2006.01)
*B60W 40/04* (2006.01)

(52) U.S. Cl. ......... 701/301; 701/117; 340/901; 340/933

(58) Field of Classification Search .............. 701/1, 224, 701/300–302, 117–119; 340/901–904, 933–943, 340/425.5, 435, 436; 342/70–72; 382/103, 382/104, 107

See application file for complete search history.

(56) References Cited

U.S. PATENT DOCUMENTS 5,165,108 A * 11/1992 Asayama ..................... 340/435
5,339,075 A * 8/1994 Abst et al. ..................... 340/903
5,652,705 A * 7/1997 Spiess ..................... 701/117
5,699,040 A 12/1997 Matsuda et al.
5,805,103 A 9/1998 Doi et al.
5,892,439 A 4/1999 Torres et al.
6,011,492 A 1/2000 Garesche
6,037,860 A * 3/2000 Zander et al. ................. 340/436
6,188,940 B1 2/2001 Blackburn et al.
6,202,027 B1 3/2001 Alland et al.
6,249,232 B1 * 6/2001 Tamura et al. ................ 340/902
6,278,360 B1 8/2001 Yanagi et al.
6,327,536 B1 * 12/2001 Tsuji et al. .................... 701/301
6,370,461 B1 4/2002 Pierce et al.
6,480,102 B1 11/2002 Miller et al.
6,502,034 B1 12/2002 Miller
6,567,737 B2 * 5/2003 Nakamura et al. .............. 701/96
6,615,137 B2 * 9/2003 Lutter et al. .................. 701/301

(Continued)

FOREIGN PATENT DOCUMENTS

GB 2 268 608 1/1994

OTHER PUBLICATIONS

Kamijo et al., Traffic Monitoring and Accident Detection at Intersections, Jun. 2000, IEEE Transactions on Intelligent Transportation Systems, vol. 1, No. 2, pp. 108-118.*

(Continued)

*Primary Examiner* — Thomas G Black
*Assistant Examiner* — Lindsay M Browder
(74) *Attorney, Agent, or Firm* — Franklin MacKenzie; Ford Global Technologies, LLC

(57) ABSTRACT

A system and method are provided to determine the collision status of a nearby vehicle or vehicles. If a nearby vehicle has been in a collision, responsive systems may be triggered automatically. Responses may include warning the driver of the host vehicle and/or warning drivers of other vehicles or centralized networks by, among other methods, V2V or V2I communications. Responses may also include automatically triggering countermeasures in the host vehicle.

20 Claims, 4 Drawing Sheets

U.S. PATENT DOCUMENTS

| | | | | |
|---|---|---|---|---|
| 6,650,983 | B1 * | 11/2003 | Rao et al. | 701/45 |
| 6,658,355 | B2 | 12/2003 | Miller et al. | |
| 6,684,149 | B2 | 1/2004 | Nakamura et al. | |
| 6,691,018 | B1 | 2/2004 | Miyahara | |
| 6,714,139 | B2 * | 3/2004 | Saito et al. | 340/903 |
| 6,721,659 | B2 * | 4/2004 | Stopczynski | 701/301 |
| 6,728,617 | B2 * | 4/2004 | Rao et al. | 701/45 |
| 6,753,804 | B2 | 6/2004 | Miyahara | |
| 6,768,446 | B2 | 7/2004 | Tamatsu et al. | |
| 6,804,602 | B2 * | 10/2004 | Impson et al. | 701/117 |
| 6,819,991 | B2 | 11/2004 | Rao et al. | |
| 6,894,608 | B1 * | 5/2005 | Gunderson | 340/468 |
| 6,925,378 | B2 | 8/2005 | Tzamaloukas | |
| 6,944,543 | B2 | 9/2005 | Prakah-Asante et al. | |
| 6,985,089 | B2 | 1/2006 | Liu et al. | |
| 7,124,027 | B1 * | 10/2006 | Ernst et al. | 701/301 |
| 7,188,012 | B2 | 3/2007 | Salmeen et al. | |
| 7,243,013 | B2 | 7/2007 | Rao et al. | |
| 7,245,231 | B2 | 7/2007 | Kiefer et al. | |
| 7,260,461 | B2 | 8/2007 | Rao et al. | |
| 7,263,209 | B2 | 8/2007 | Camus et al. | |
| 7,289,019 | B1 * | 10/2007 | Kertes | 340/435 |
| 7,343,235 | B2 | 3/2008 | Isaji et al. | |
| 7,418,346 | B2 | 8/2008 | Breed et al. | |
| 7,427,929 | B2 * | 9/2008 | Bauer et al. | 340/905 |
| 7,437,246 | B2 * | 10/2008 | Kelly et al. | 701/301 |
| 7,579,942 | B2 * | 8/2009 | Kalik | 340/435 |
| 7,742,864 | B2 * | 6/2010 | Sekiguchi | 701/96 |
| 7,804,413 | B2 * | 9/2010 | Birk et al. | 340/576 |
| 2007/0096892 | A1 * | 5/2007 | Nathan et al. | 340/471 |
| 2007/0168104 | A1 | 7/2007 | Nelson et al. | |
| 2007/0255480 | A1 | 11/2007 | Southall et al. | |
| 2008/0041297 | A1 | 2/2008 | Vazin | |
| 2008/0042825 | A1 * | 2/2008 | Denny et al. | 340/522 |
| 2008/0140287 | A1 * | 6/2008 | Yang et al. | 701/45 |
| 2008/0215231 | A1 * | 9/2008 | Breed | 701/117 |
| 2009/0021355 | A1 * | 1/2009 | Meister et al. | 340/425.5 |

OTHER PUBLICATIONS

Sun et al., On-Road Vehicle Detection: A Review, May 2006, IEEE Transactions on Pattern Analysis and Machine Intelligence, vol. 28, No. 5, pp. 694-711.*

Sun et al., On-Road Vehicle Detection Using Optical Sensors: A Review, Oct. 2004, 2004 IEEE Intelligent Transportation Systems Conference, pp. 585-590.*

Yang et al., A Vehicle-to-Vehicle Communication Protocol for Cooperative Collision Warning, Aug. 2004, The First Annual International Conference on Mobile and Ubiquitous Systems: Networking and Services (MOBIQUITOUS 2004), p. 114.*

Srinivasa, Vision-Based Vehicle Detection and Tracking Method for Forward Collision Warning in Automobiles, 2002, IEEE Intelligent Vehicle Symposium 2002, vol. 2, pp. 626-631.*

* cited by examiner

SYSTEM AND METHOD FOR DETERMINING A COLLISION STATUS OF A NEARBY VEHICLE

TECHNICAL FIELD

This disclosure relates to sensing systems for automotive vehicles to determine whether a nearby vehicle or vehicles have been in a collision; and if so, responding accordingly.

BACKGROUND

When traffic volumes are high, vehicles slow down and speed up frequently and unpredictably, especially on highways. Unfortunately, due in part to driver distractions such as cell phones and the like, it is possible for a driver of a host vehicle to fail to realize a nearby vehicle has been in a crash event. This can lead to an otherwise avoidable pile-up crash event, especially when traffic is dense.

When traffic is less dense, speeds are often increased. If a driver of a host vehicle is less attentive to other vehicles because of reduced traffic or because of one or more distractions, the driver may fail to observe a collision that happened, even if the collision occurred in front of the host vehicle. This can cause the driver of the host vehicle to hit the two or more collided vehicles. At higher speeds, such collisions can cause more severe bodily harm and property damage.

Existing crash sensing systems do not identify the collision status of nearby vehicles; that is, whether a nearby vehicle has been in a crash, and respond accordingly with warnings to a host driver, other drivers, or countermeasures such as automatic application of brakes, tensioning of seat belts, or prearming of air bags.

It is therefore desirable to provide systems and methods for identifying the collision status of nearby vehicles. It is also desirable to provide systems and methods for responding to the collision status of a nearby vehicle and for identifying non-drivable paths as well as available and preferred driving paths. It is desirable to provide a warning to a driver of a host vehicle, as well as to drivers of other vehicles and to infrastructure support systems. It is also desirable to automatically apply countermeasures when appropriate, especially if a driver of a host vehicle is distracted or otherwise prevented from doing so.

SUMMARY

Systems and methods are provided to address, at least in part, one or more of the needs or desires left unaddressed by prior systems and methods.

A system for determining the collision status of nearby vehicles and responding to same is provided. The system includes a mechanism for detecting the presence and speed of nearby vehicles. The system also includes a controller for determining the rate of change of the sensed speed of these vehicles in a longitudinal direction; that is, in the direction of travel of the nearby vehicle. The rate of change of speed (acceleration or deceleration) is compared to threshold values to determine the collision status of these nearby vehicles. If a vehicle or vehicles have been in a collision, a signal is configured to trigger a response.

A method of avoiding a collision is also provided. The method includes determining the collision status of nearby vehicles based upon their rate of change of speed in a longitudinal direction. The method includes automatically responding to the determined collision status.

DETAILED DESCRIPTION

Figure 1:
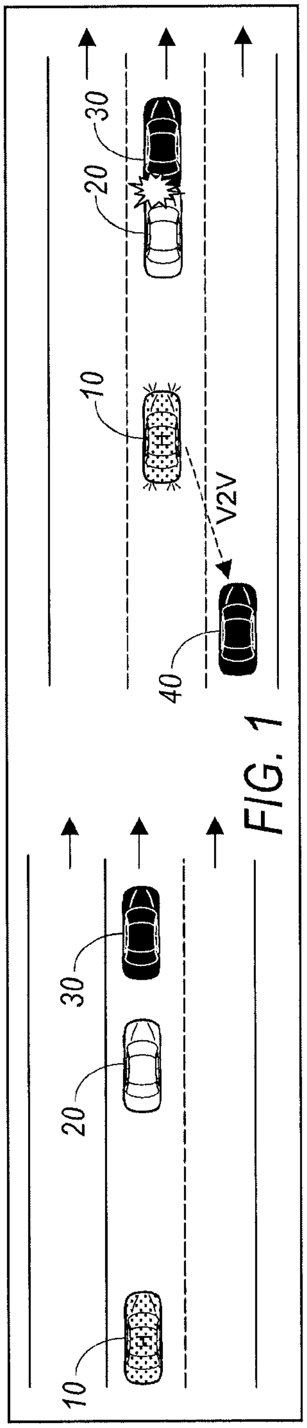
FIG. 1 is an exemplary depiction of a host vehicle detecting and communicating the collision status of a nearby vehicle.

In FIG. 1, a host vehicle 10 is shown following two nearby vehicles 20 and 30. All vehicles are traveling in the same direction. Eventually, vehicles 20 and 30 collide. In this example, the host vehicle 10 detects the collision status of vehicle 20 as positive for at least the reason that the longitudinal deceleration of vehicle 20 falls outside of predetermined threshold values. Host vehicle 10 then provides a warning to the driver in host vehicle 10 as well as to other drivers such as the driver of nearby vehicle 40 of the sensed collision. Any known warning methods and mechanisms may be used to alert the drivers of the collision. FIG. 1 illustrates a few exemplary non-limiting warning methods and mechanisms. The driver in vehicle 40 is being alerted of a general driving hazard by the flashing hazard lights of the host vehicle 10. The driver in vehicle 40 is also being alerted of the specific problem that a nearby collision has occurred, in front of vehicle 40 in the non-limiting depiction, by vehicle-to-vehicle (V2V) communications initiated by host vehicle 10. Other types of communications are contemplated for use with the systems described herein, including vehicle-to-infrastructure (V2I) communications. The infrastructure can then communicate with equipped vehicles 40 as well as dispatch emergency services, traffic flow warning systems, and the like. Mechanisms and methods for detecting the collision status of a nearby vehicle, as well as warning systems associated therewith are described in more detail herein.

Figure 2:
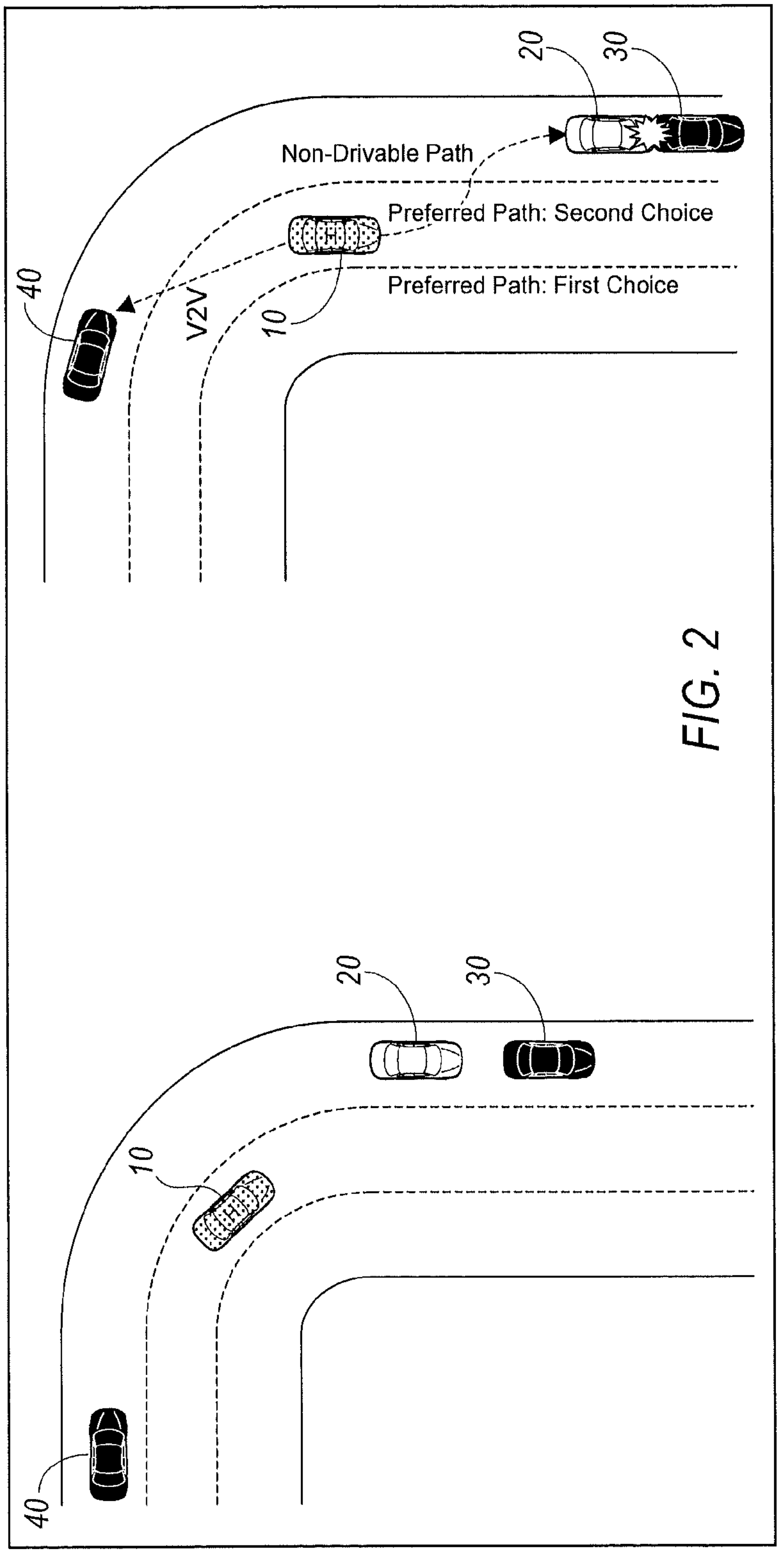
FIG. 2 is an exemplary depiction of a host vehicle detecting and communicating the collision status of a nearby vehicle.

In FIG. 2, a host vehicle 10 is shown in traffic on a curved road wherein all vehicles are traveling in the same direction. Eventually, vehicles 20 and 30 collide outside of the visual field of view for the driver of vehicle 40. The host vehicle 10 determines that the collision status of vehicle 20 is positive based at least in part on the longitudinal deceleration of the vehicle 20. The host vehicle 10 then provides a warning to the driver in host vehicle 10 as well as to other drivers such as the driver of nearby vehicle 40 of the sensed collision. In FIG. 2, the driver in vehicle 40 is being alerted of a general driving hazard by V2V communications initiated by host vehicle 10. In FIG. 2, sensors and/or other equipment on the host vehicle 10 are able to determine which paths are drivable on the curved road. The depiction shows the lane in which the collision occurred is a non-drivable path, and the two other lanes are available as drivable paths. In the non-limiting example, a system on host vehicle 10 is able to determine that the lane furthest from the collision is a "first choice" preferred drivable path and the lane adjacent to the collision is a "second choice" preferred drivable path. The drivable path information is also able to be communicated to equipped vehicles 40 via V2V communications and/or to infrastructure using V2I communications.

Figure 3:
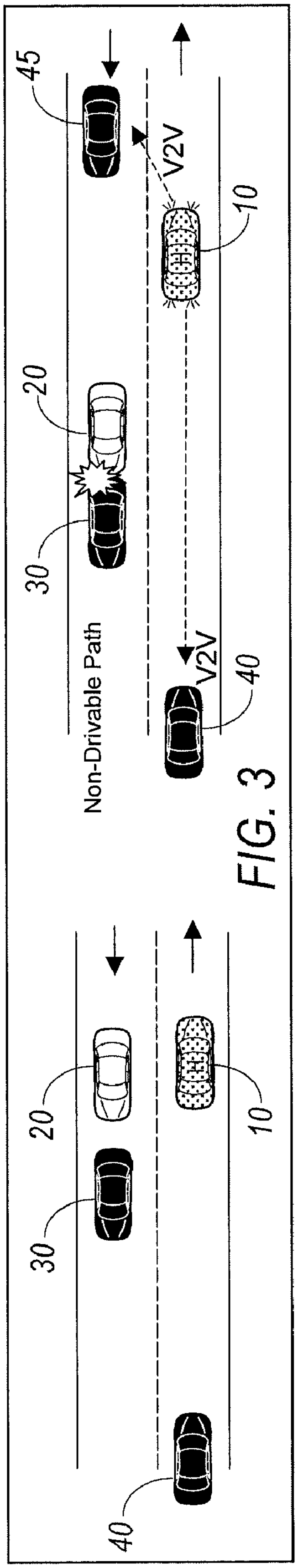
FIG. 3 is an exemplary depiction of a host vehicle detecting and communicating the collision status of a nearby vehicle.

In FIG. 3, the host vehicle 10 is traveling in a lane in the same direction as nearby vehicle 40. Vehicles 20 and 30, and nearby vehicle 45 are traveling in the opposite direction and are in a lane adjacent to the lane in which the host vehicle 10 is traveling. Vehicles 20 and 30 collide, and the host vehicle 10 determines that the collision status of vehicle 20, to its side and rear but within the field of view of its sensing system, is positive based at least in part upon the longitudinal deceleration of vehicle 20. Host vehicle 10 is depicted as initiating V2V communications to nearby equipped vehicles 40 and 45 to notify them of the collision status of vehicle 20 and of the non-drivable path in their vicinity. The V2V message can also include that the lane of the host vehicle 10 has traffic in it and may also be a non-drivable path. This way, the driver of vehicle 45 can make the appropriate determination to brake, steer around, or otherwise avoid driving into any non-drivable path.

Figure 4:
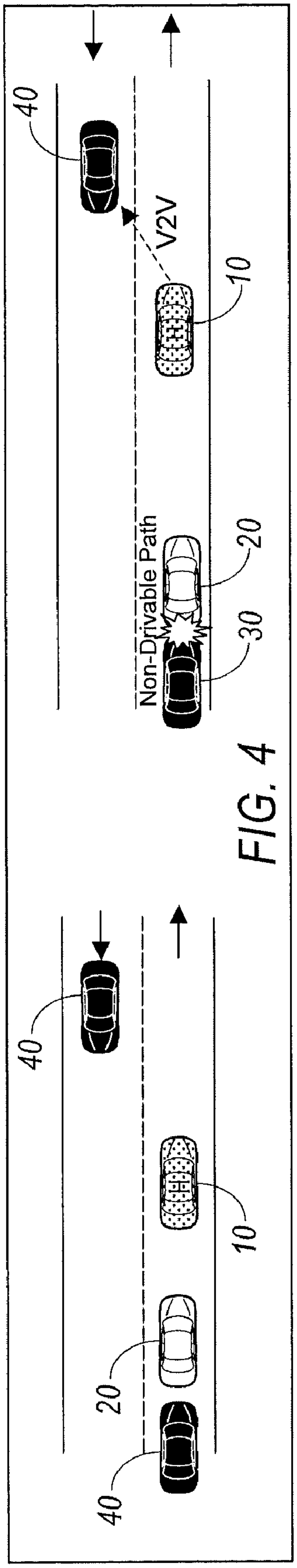
FIG. 4 is an exemplary depiction of a host vehicle detecting and communicating the collision status of a nearby vehicle.

In FIG. 4, the host vehicle 10 is traveling in front of and in the same direction as vehicles 20 and 30. Nearby vehicle 40 is traveling in the opposite direction in an adjacent lane. Vehicles 20 and 30 collide, and the host vehicle 10 determines that the collision status of vehicle 20, to its rear, is positive based at least in part upon the longitudinal acceleration of vehicle 20. Host vehicle 10 is depicted as initiating communication with the infrastructure using V2I communications and V2V communications to nearby equipped vehicle 40 to notify it of the collision status of vehicle 20 and of the non-drivable path in its vicinity.

Figure 5:
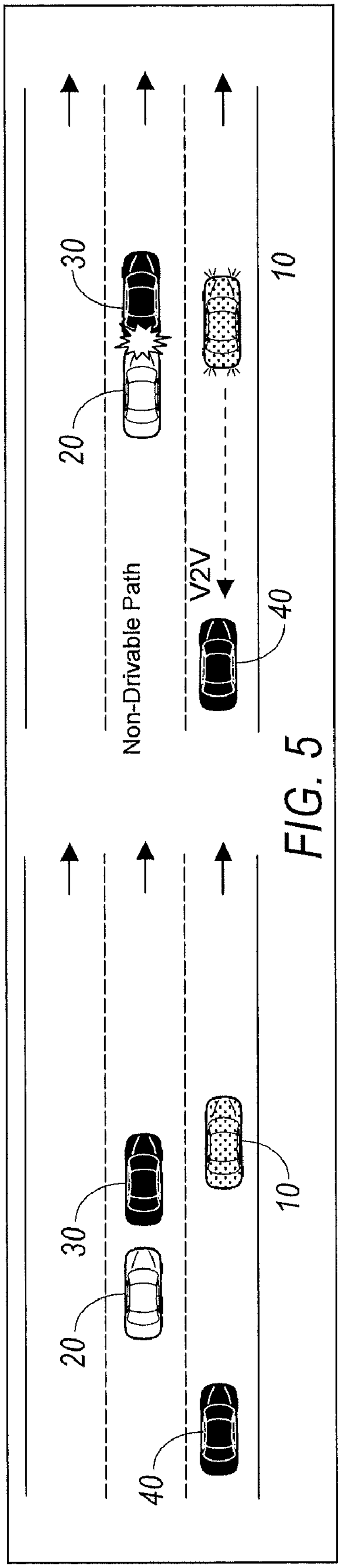
FIG. 5 is an exemplary depiction of a host vehicle detecting and communicating the collision status of a nearby vehicle.

In FIG. 5, the host vehicle 10 is traveling in the same direction as vehicles 20 and 30 in a lane adjacent to vehicles 20 and 30. Vehicle 40 is traveling behind the host vehicle 10 in the same lane. Vehicles 20 and 30 collide, and the host vehicle 10 determines that the collision status of vehicle 20, to its side, is positive based at least in part upon the longitudinal deceleration of vehicle 20. Host vehicle 10 is also able to determine that the collision status of vehicle 30, to its side, is positive based at least in part upon the longitudinal acceleration of vehicle 30. Host vehicle 10 is depicted as initiating communication with the infrastructure using V2I communications and V2V communications to nearby equipped vehicle 40 to notify it of the collision status of vehicles 20 and 30 and of the non-drivable path in its vicinity.

Figure 6:
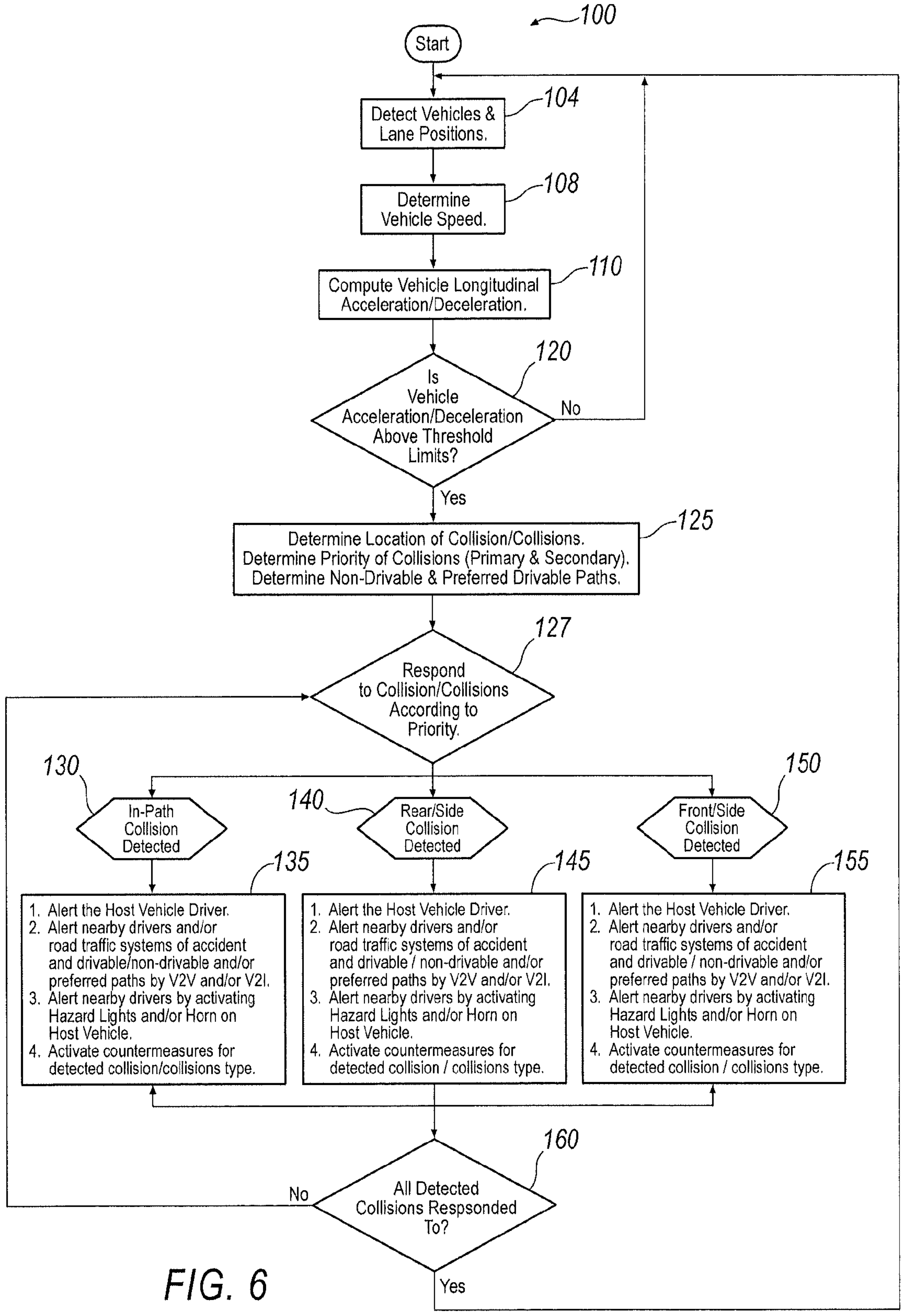
FIG. 6 is a flow chart providing logic for detecting a collision status and responding to the collision status.

In FIG. 6, an exemplary flow chart is provided for a system for use in avoiding a collision with one or more nearby vehicles that have been in a collision. All or some of the steps in FIG. 6 may be implemented in particular commercial systems.

In starting oval 100, a system may be turned on or off to detect whether a collision has occurred near a host vehicle. That is, the host vehicle may be configured to determine the collision status of nearby vehicles.

Processing step box 104 shows that one or more sensors may be used to detect nearby vehicles and the lane positions of one or more nearby vehicles. The presence of a nearby vehicle may be detected using a vision system, such as the one described in U.S. Pat. No. 7,263,209, which is incorporated herein in its entirety. Additionally, sensors including radar sensors and lidar sensors may be used on a host vehicle to sense the presence of a nearby vehicle (a vehicle within the field of view of at least one of the sensors) from a host vehicle. Other known sensing systems and methods for determining the distance between a host vehicle and nearby vehicles are also contemplated. Nearby vehicles need not be in front of the host vehicle; they may be positioned in any direction from the host vehicle so long as the sensing system on the host vehicle has a field of view in which the nearby vehicles fall.

Processing step box 108 shows the determination of the speed of the nearby vehicle. This step may be performed using any known method or system. Processing step box 110 shows the computation of the longitudinal rate of change of speed (acceleration or deceleration) of detected nearby vehicles. This can be done by determining the speed of the detected nearby vehicles over predetermined time intervals.

Decision diamond 120 calls for determining whether the detected nearby vehicle's longitudinal acceleration or deceleration falls outside of a predetermined range. As is known, a nearby vehicle that has been in a collision may be substantially slowed down in its forward motion, stopped, thrown in a backward direction or kicked in a forward direction. Thus, the rate of change of a nearby vehicle's longitudinal speed can provide an indication of its collision status, if the rate of change of speed is outside of predetermined thresholds. Such thresholds can be calculated, obtained, recorded, modified and/or stored using any known method, mechanism, system or device.

If the determined acceleration or deceleration of a nearby vehicle is outside of the predetermined threshold limits, a controller may include logic that sets the collision status of the nearby vehicle to positive from a default value of negative. If it is determined that the nearby vehicle has not been in a collision, then the collision status remains negative and the system may return to starting 100. If the collision status is positive, then a controller may include logic that causes a series of related determinations to be made. For example, processing box 125 allows for the determination of the location of any detected collision or collisions. Processing box 125 also suggests that logic may be included to determine whether a detected collision is primary or secondary. If multiple collisions are detected, then the collisions may also be classified according to level of risk presented to the driver of the host vehicle for prioritization. Processing box 125 also suggests that a determination of non-drivable paths, available drivable paths, and preferred drivable paths be made. To make this determination, sensors may be used to identify non-drivable paths and available drivable paths. Such sensors may provide input to a controller to determine and select preferred driving paths among the choices of available drivable paths. Such a prioritizing of drivable paths is exemplified in FIG. 2.

If the collision status is positive, a controller causes a signal to be sent to trigger a response. As exemplified in decision diamond 127, the response to the detected collision or collisions may be ordered or prioritized according to the classification of risk presented to the host vehicle.

A response to a positive collision status can additionally be tailored according to the location of the nearby vehicle or vehicles that have been in a collision. For example, if the collision status of a nearby vehicle that is in driving path of the host vehicle is positive, then an in-path collision is detected as shown in hexagon condition 130. Then, any one or more of the responses in processing box 135 may be initiated. The particular responses listed in processing box 135 are merely exemplary and not intended to be limiting. For example, a general or specific warning may be provided to the driver of the host vehicle. The warning may be haptic, auditory or visual or a combination thereof. For example, a dashboard light display could be made to flash the words "CRASH HAZARD AHEAD" while a voice recording announced "Crash Hazard Ahead." Alternatively, a general auditory warning could be issued such as an alarm, chime, or buzzer.

Specific warnings may also be provided to alert drivers of other vehicles and/or to alert road traffic systems. For example, a specific warning about a particular collision may be transmitted from the host vehicle to alert drivers of other vehicles that are equipped to receive V2V communications. V2V is technology that is designed to allow vehicles to "talk" to each other. V2V systems may use a region of the 5.9 gigahertz band, the unlicensed frequency also used by WiFi. Exemplary suitable V2V systems and protocols are disclosed in U.S. Pat. Nos. 6,925,378, 6,985,089, and 7,418,346, each of which is incorporated by reference in its entirety. Similarly, the host vehicle may alert road traffic systems or other infrastructure of the detected accident using V2I systems or cooperative vehicle-infrastructure systems (CVIS). V2I systems are identified in U.S. Patent Publication No. 20070168104, which is incorporated by reference in its entirety. Such an infrastructure or centralized network may trigger communications to initiate emergency responses, such as police, ambulance, fire, and the like. It may also be used to provide input to traffic signal systems and the like.

The specific V2V or V2I warning about the detected collision or collisions may be coupled with information about non-drivable paths, drivable paths and preferred paths. By way of non-limiting examples, the warning may include a statement such as "MOVE INTO RIGHT LANE" or "AVOID LEFT LANE," or the warning might rank drivable paths as first choice or a second choice. The V2V drivable lane communication may be particularly useful when other vehicles adapted to receive V2V information cannot see the host vehicle or the collision involving the nearby vehicle, as shown in FIG. 2.

General warnings may also be provided to alert drivers of other nearby vehicles of a hazard. For example, a general warning may originate from the host vehicle. The warning may be auditory or visual or both. The warning may be as simple as blowing the horn on the host vehicle, causing the brake lights on the host vehicle to be illuminated or causing the hazard lights on the host vehicle to begin flashing.

Other response systems may be triggered as shown in processing box 135. For example, countermeasures may be employed according to the characteristics of the detected collision or collisions. If a collision status is determined to be positive for an in-path nearby vehicle, one response may be to automatically apply the brakes of the host vehicle. Another response may be to pre-tension safety belts or provide input into an air bag deployment algorithm to pre-arm the system for a potentially quicker response when a collision occurs that involves the host vehicle.

The response systems can be tailored according to the physical location of the vehicle or vehicles that have a positive collision status. For example, if the controller determines that a nearby vehicle in the rear/side of the host vehicle has been in a collision (condition hexagon 140), then certain response systems may be more useful than they would be if the collision had occurred to a nearby vehicle that is on the front/side of the host vehicle (condition hexagon 150). The responses in processing box 145, among others, may be used where the accident or collision occurs behind the host vehicle or behind the host vehicle and also to its side. These responses include alerting the driver of the host vehicle, alerting drivers of nearby vehicles of the accident and of drivable route information, and providing general alerts such as activating the hazards lights and/or horn of the host vehicle. The responses may also include alerting a road traffic system using V2I. Countermeasures may also be activated, but are less likely to be necessary when an accident occurs that the host vehicle has already passed, as exemplified in FIG. 4.

The responses in processing box 155, among others, may be used where the accident or collision occurs in front of the host vehicle and/or to the side of the host vehicle. These responses include alerting the driver of the host vehicle, alerting drivers of nearby vehicles of the accident and of drivable route information, and providing general alerts such as activating the hazards lights and/or horn of the host vehicle. The responses may also include alerting a road traffic system using V2I. Countermeasures may be desired when an accident occurs to the front or to the side of the host vehicle, as exemplified in FIG. 5.

In decision diamond 160, it is determined whether the host vehicle has responded to all of the detected or sensed collisions. If not, the logic returns to decision diamond 127 to address the remaining collisions. If all of the sensed collisions have been addressed, then the logic returns to starting oval 100.

The systems and methods described herein may be used in conjunction with other pre-crash sensing systems and warning/countermeasure systems, and may share components and/or logic with said systems. For example, it is contemplated that a host vehicle with the above-disclosed system may also employ the methods and apparatuses disclosed in U.S. Pat. Nos. 6,188,940, 6,370,461, 6,480,102, 6,502,034, 6,658,355, 6,819,991, 6,944,543, 7,188,012, 7,243,013 and 7,260,461, each of which is incorporated by reference in its entirety.

Figure 7:
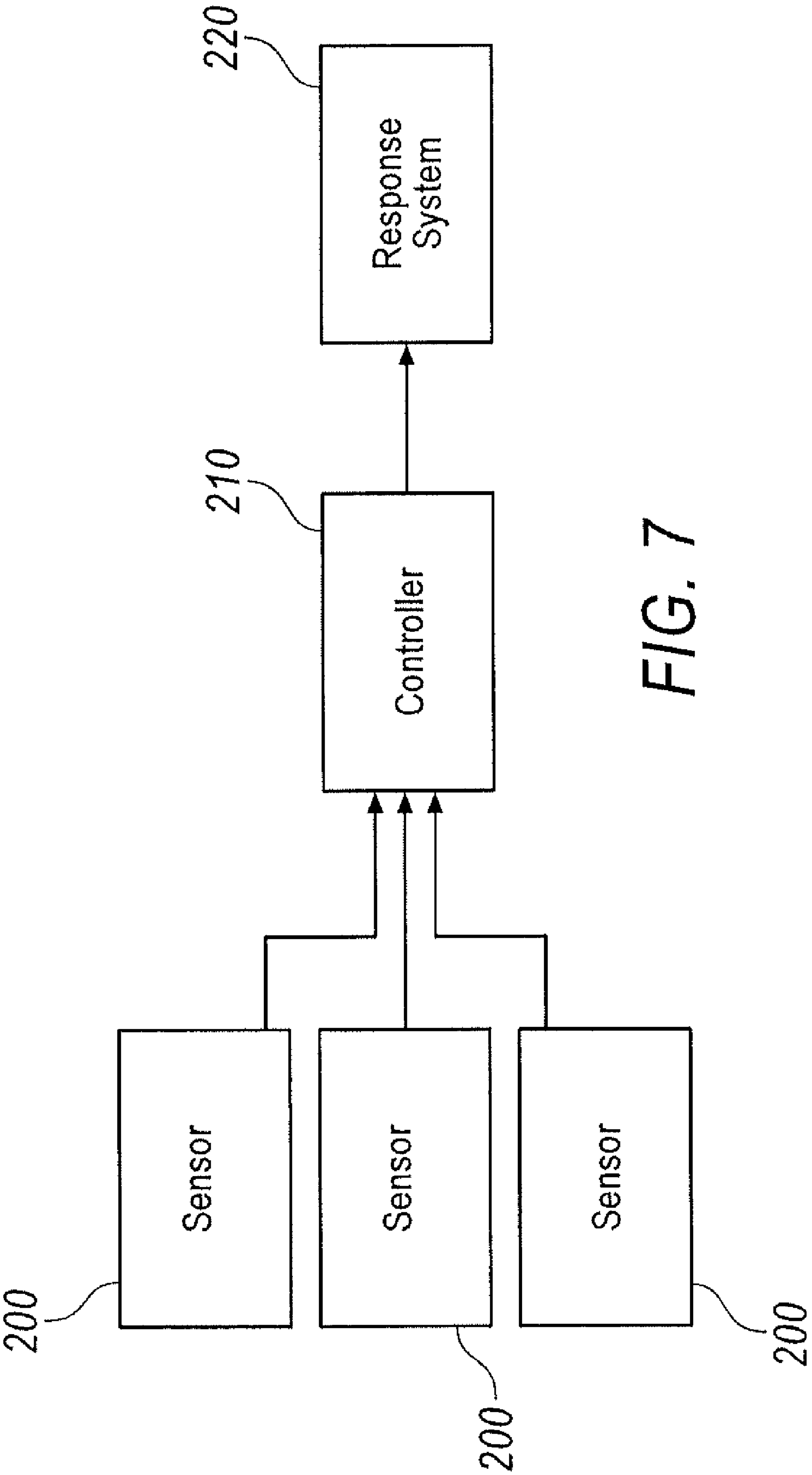
FIG. 7 is a schematic of a system for detecting a collision status and responding to the collision status.

In FIG. 7, an illustrative schematic is shown for a system of attempting to avoid a collision with a nearby vehicle that has been in a collision. Sensors 200 provide input to controller 210 regarding data relevant to the rate of closure of the nearby vehicle. As noted above, sensors 200 may be vision-based, radar, lidar, or combinations thereof. Controller 210 includes logic to determine if the rate of closure of the nearby vehicle his greater than a pre-determined threshold. If the rate of closure is too high, then the collision status of the nearby vehicle is positive and the controller 210 causes a signal to be sent to one or more response systems 220, as noted above. The response system 220 may warn the driver of the host vehicle and/or other vehicles, and may initiate countermeasures.

While at least one embodiment of the appended claims has been described in the specification, those skilled in the art recognize that the words used are words of description, and not words of limitation. Many variations and modifications are possible without departing from the scope and spirit of the invention as set forth in the appended claims.

We claim:

1. A system installable on a host vehicle for determining a collision status of a remote vehicle and responding to same, the system comprising;

(a) a mechanism for sensing a presence and a longitudinal speed of the remote vehicle;

(b) a controller for determining the rate of change of the sensed speed of the remote vehicle and comparing same to threshold values to determine the collision status of the remote vehicle; and (c) if the remote vehicle has been in a collision, a signal is configured to trigger a response.

2. The system of claim 1 wherein the mechanism is a sensing system that comprises at least one of a radar sensor, a lidar sensor or a vision-based sensor.

3. The system of claim 1 wherein the mechanism comprises vehicle-to-vehicle communications.

4. The system of claim 1 wherein the response is a visual warning in the host vehicle.

5. The system of claim 1 wherein the response is an audible warning in the host vehicle.

6. The system of claim 1 wherein the response is a haptic warning in the host vehicle.

7. The system of claim 1 wherein the response is to alert drivers of other vehicles of the collision status of the remote vehicle via vehicle-to-vehicle communications.

8. The system of claim 1 wherein the response is to alert drivers of other vehicles of the collision status of the remote vehicle via setting hazard lights of the host vehicle to on.

9. The system of claim 1 wherein the response is the application of at least one countermeasure.

10. The system of claim 1 further comprising: (d) if the vehicle has been in a collision, an apparatus for identifying non-drivable paths, drivable paths, and preferred drivable paths.

11. The system of claim 10 further comprising a controller for selecting preferred drivable paths among available drivable paths.

12. The system of claim 11 further comprising: (e) a signal configured to trigger an audio or visual alert in the host vehicle that identifies one or more of non-drivable, drivable and preferred drivable path information.

13. A method of avoiding a collision, comprising, from a host vehicle:

(a) determining a collision status of a remote vehicle based upon a change of speed of the remote vehicle in a longitudinal direction; and (b) automatically responding to the collision status.

14. The method of claim 13 wherein the automatically responding step comprises providing a visual warning to a driver of the host vehicle.

15. The method of claim 13 wherein the automatically responding step comprises providing an audible warning to a driver of the host vehicle.

16. The method of claim 13 wherein the automatically responding step comprises providing a haptic warning to a driver of the host vehicle.

17. The method of claim 13 wherein the automatically responding step comprises providing a warning to drivers of other vehicles via vehicle-to-vehicle communications.

18. The method of claim 13 wherein the automatically responding step comprises providing a warning to drivers of other vehicles via turning on hazard lights on the host vehicle.

19. The method of claim 13 wherein the automatically responding step comprises applying at least one countermeasure.

20. A system installable on a host vehicle for determining a collision status of a remote vehicle and responding to same, the system comprising;

(a) a mechanism for sensing a presence and a longitudinal speed of the remote vehicle;

(b) a controller for determining the rate of change of the sensed speed of the remote vehicle and comparing same to threshold values to determine the collision status of the remote vehicle;

(c) if the remote vehicle has been in a collision, a signal is configured to trigger a response; and (d) if the remote vehicle has been in a collision, an apparatus for identifying non-drivable paths, drivable paths, and preferred drivable paths, wherein driving path information is communicated to the host vehicle via vehicle-to-vehicle or vehicle-to-infrastructure communication.

* * * * *